United States Patent [19]
Lee et al.

[11] Patent Number: 5,682,370
[45] Date of Patent: Oct. 28, 1997

[54] APPARATUS FOR RECORDING AND SELECTIVELY PLAYING AN OPTICAL DISC AND A CASSETTE-ENCASED TAPE

[75] Inventors: Jie-Hoon Lee, Seoul; Ho-Geol Kim, Kyeonggi-Do, both of Rep. of Korea

[73] Assignee: Daewoo Electronics Co., Ltd., Seoul, Rep. of Korea

[21] Appl. No.: 580,445

[22] Filed: Dec. 27, 1995

[30] Foreign Application Priority Data

Dec. 29, 1994 [KR] Rep. of Korea .............. 94-38618

[51] Int. Cl.$^6$ ................................ G11B 33/02
[52] U.S. Cl. ...................................... 369/75.2
[58] Field of Search ................ 369/14, 15, 75.1, 369/75.2, 77.1, 77.2; 360/92, 94

[56] References Cited

U.S. PATENT DOCUMENTS

| | | | |
|---|---|---|---|
| 5,177,730 | 1/1993 | Utsugi | 369/75.1 |
| 5,301,177 | 4/1994 | Kumakura | 369/75.2 |
| 5,386,329 | 1/1995 | Ikegawa | 360/94 |

FOREIGN PATENT DOCUMENTS 2-265081   10/1990   Japan .

*Primary Examiner*—Stuart S. Levy
*Assistant Examiner*—George J. Letscher
*Attorney, Agent, or Firm*—Beveridge, DeGrandi, Weilacher & Young LLP

[57] ABSTRACT

A composite recording and reproducing apparatus which discloses recording and/or reproducing both an optical disc and a cassette tape. A disc inserting hole for inserting a disc and a tape inserting hole for inserting a tape cassette are provided at the front of a body. A front panel having a door for opening the disc and tape inserting holes is combined with the front side of the body. A tape driving part for reproducing and driving a tape is provided at an upper inner portion of the body. A disc driving part for reproducing the disc has a disc tray which is slidably transported to the inside and outside of the body while mounting the disc thereon. Racks are formed on both lower sides of the disc tray. A door opening apparatus is provided for selectively opening the disc door in accordance with the transportation of the disc tray. Simultaneous insertion of the disc and the tape cassette is performed so that simultaneous reproducing and recording of the disc and the tape cassette is performed. During the transportation of the disc tray for inserting the disc, the disc door is automatically opened.

4 Claims, 9 Drawing Sheets

APPARATUS FOR RECORDING AND SELECTIVELY PLAYING AN OPTICAL DISC AND A CASSETTE-ENCASED TAPE

BACKGROUND OF THE INVENTION

The present invention relates to a composite recording and reproducing apparatus. More particularly, the present invention relates to a composite recording and reproducing apparatus for recording and selectively playing an optical disc and a cassette-encased tape. The present invention is an improvement over the invention which is the subject matter of one of the present inventor's co-pending U.S. patent application Ser. No. 08/528,248 filed on Sept. 14, 1995, the disclosure of which is hereby incorporated into this application by reference.

Recently, an information recording/reproducing apparatus such as tape players and disc players has been widely used.

Tape players can record information on and/or reproduce information from magnetic or optical recording tapes such as cassette tape and video tape, while disc players can record information on and/or reproduce information from discs of magnetic or optical recording type disc such as optical video disc, digital audio disc, compact disc, mini-disc, etc.

Therefore, since tape recorders and optical disc players (such as a compact disc player) have different driving mechanisms from each other, they have their own bodies. At one side of each body, a disc insertion hole and a tape insertion hole are separately provided.

Recording/reproducing is performed using the above tape recorders and optical disc players when a tape and disc are respectively inserted into the tape and disc insertion holes which are respectively provided at the side of the bodies thereof.

Nowadays, products which are relevant to each other are integrally formed so that the convenient usage thereof is pursued. Further, simplification in the designs thereof and reducing the number of components and miniaturizing the products are also pursued. This is a recent trend.

For example, in the disc player field, Katsuichi Sakurai et al. proposed a disc player capable of reproducing both a naked disc and a cartridge-encased disc which have the same size (or diameter) in U.S. Pat. No. 5,299,185. Also, Hideo Kawachi et al. proposed the disc player capable of reproducing both a naked disc and a cartridge-encased disc which have the different sizes (or diameters) in U.S. Pat. No. 5,301,176.

In the above Hideo Kawachi et al. patent, there is disclosed an apparatus for elevating the spindle assembly wherein one side of a chassis supporting the spindle assembly is fixed to a main chassis of the disc player and the spindle assembly can be moved up and down in a radial direction centering around the fixing point.

Thus, the naked disc and the cartridge-encased disc in which the discs are the same size are operated by a single modified operating device, which contributes to a reduced number of required constituent elements and to the miniaturization of the product.

In contrast, in the case of tape recorders and optical disc players, since they are different from each other in operating mechanism, it is necessary to provide an composite recording/reproducing apparatus having an inventive integral construction which has different operating parts for the tape recorder and optical disc player respectively, and which is constructed in consideration of the interrelationship between those parts.

As above, when the tape recorder and the optical disc player are integrally formed, the size of the products vary depending on the position of the tape recorder and the optical disc player. Therefore, these positions should be determined after serious consideration. In view of the structure simplification of the products and mutual interference of the tape recorder and the optical disc player, the disc player is preferably positioned behind the optical disc player. However, in such a case, transporting the disc tray on which a disc is mounted is difficult. That is, since the disc player is located behind the tape recorder, the transporting length of the disc tray is very long, which lengthens the length of the products.

Therefore, one of the present inventors, Ho-geal Kim, accomplished an invention concerning a composite recording/reproducing apparatus in which respective operating parts for operating a tape and disc player are integrally constructed, and which is capable of inserting a disc and tape through a single inserting part, thereby simplifying the structure of the product and reducing its entire size, and filed with USPTO on Sep. 14, 1995 as a Ser. No. 08/528,248, which is now pending in USPTO.

FIG. 1 is a schematic plan view for showing a composite recording and reproducing apparatus of the present invention. FIG. 2 is a left side elevation view of the composite recording and reproducing apparatus of FIG. 1 wherein a disc has been loaded. FIG. 3 is a right side elevational view of the composite recording and reproducing apparatus of FIG. 1 wherein the disc tray has been ejected. FIG. 4 is a front elevational view for showing the composite recording and reproducing apparatus of FIG. 1. FIG. 5 is an enlarged partial view of a cross-section taken along the line A—A of the composite recording and reproducing apparatus of FIG. 1.

As shown in FIG. 1, one pan of a body 100 of a composite recording and reproducing apparatus according to the present invention is shown in a dotted line. A reference numeral 110 denotes an inserting opening provided at a front side of body 100 for inserting a cassette tape and an optical disc. A tape driving part 200 is provided at the inside of body 100 to drive the cassette tape. Tape driving pan 200 is provided with a tape recorder deck 210 and a holder 220. Tape recorder deck 210 is provided with a running system having a head drum (not shown), and holder 220 is provided for placing the tape on tape recorder deck 210.

Meanwhile, a disc driving part 300 to drive an optical disc is provided behind tape driving pan 200. Disc driving part 300 is provided with a disc tray 310 in which guide grooves 311 are formed on both sides of the lower surface of disc tray 310 in order to transfer the disc to the inside or the outside of body 100. Disc driving part 300 is also provided with a disc deck 320 for placing the disc transferred by disc tray 310 on disc deck 320. Moreover, disc driving part 300 is provided with a disc tray transferring apparatus 330 to transfer disc tray 310 to the inside or the outside of body 100, and disc deck rotating apparatus 390 to transfer disc deck 320 to a loading position.

The disc transferred by disc tray 310 is placed in a hinge joined state with one side of the body on disc deck 320 which is rotated by disc deck rotating apparatus 390.

Meanwhile, right and left guide plates 140 and 140' are fixed on both sides of the upper surface of body 100 between tape driving part 200 and disc driving part 300. A plurality of guide projections 150 are projected from the predetermined positions of the fight and left guide plates 140 and 140' and the upper surface of disc deck 320, i.e., from the positions corresponding to guide grooves 311 of disc tray 310. Guide projections 150 formed at the positions corresponding to guide grooves 311 of disc tray 310 of these guide projections 150 preferably have lozenge shapes in order to smoothly transfer disc tray 310. Thereby, the friction between guide grooves 311 of disc tray 310 and guide projections 150 formed at the positions corresponding to them is minimized so that disc tray 310 can be smoothly slid by guide projections 150.

On the other hand, disc tray transferring apparatus 330 has first, second and third gear groups 360, 370, and 380 installed on disc deck 320 or body 100, and also a disc tray transferring rack formed on lower surface of disc tray 310 to be engaged with gear groups 360, 370, and 380. That is, disc tray transferring apparatus 330 has first gear group 360 having a driving motor M and a plurality of gears 361, 362 and 363 rotated by this driving motor M in order to transfer disc tray 310 to the inside or outside of body 100. Disc tray transferring apparatus 330 has also second gear group 370 installed on a path of disc tray 310 to be transferred. For example, second gear group 370 may be provided at the upper surface of left guide plate 140 of the above mentioned right and left guide plates 140 and 140'. A gear 371 of second gear group 370 is belt pulley connected with last gear 363 to be rotated by last gear 363. A third gear group 380 is installed at spaced position on body 100 with second gear group 370 on a path of disc tray 310 to be transferred. Third gear group is connected with second gear group 370 via a belt pulley to rotate second gear group 370.

Rack 331 is formed on lower surface of disc tray 310 along transferring direction of disc tray 310 to be engaged with first, second, and third gear groups 360, 370, and 380. Thus, each gear 361, 362, 363, 371, or 381 of gear groups 360, 370, and 380 is rotated in engagement with rack 331 of lower surface of disc tray 310, whereby disc tray transferring apparatus 330 transfers disc tray 310 to the inside or the outside of body 100.

Disc deck rotating apparatus 390 is slidably connected with one side of the inside of body 100 and rotated simultaneously with the transfer of disc tray 310 to transfer disc deck 320 to a loading position.

Disc deck rotating apparatus 390 has a disc deck transferring plate 391 which is successively moved with disc tray transferring apparatus 330 and an disc deck auxiliary transferring plate 396 which is formed to bend downwards from disc deck transferring plate 391. Disc deck transferring plate 391 is provided with a rack 392 formed along the right and left directions of the front of disc deck 320 so that disc deck 320 can be slidably moved in the right and left directions. Disc deck auxiliary transferring plate 396 is extended to bend downwards from transferring plate 391, and having a sloped groove 397 formed with a predetermined slope on auxiliary transferring plate 396. Disc deck rotating apparatus 390 is located such that disc deck transferring plate 391 of disc deck rotating apparatus 390 is arranged at the upper surface of the front of disc deck 320 from which the disc is to be inserted, and disc deck auxiliary transferring plate 396 which extended downwards by bending from transferring plate 391 is arranged at the side surface of disc deck 320. Disc deck 320 is provided with a disc deck transferring projection 321 projected from a side of disc deck 320, disc deck transferring projection 321 can be slidably transferred along sloped groove 397 of disc deck rotating apparatus 390, and thus rotates disc deck 320.

Meanwhile, transferring plate 391 of disc deck rotating apparatus 390 has a guide rod 392 projected thereon. Disc tray 310 has a guide rail 393 at a position corresponding to guide rod 392 on the lower surface thereof.

Guide rail 393 is formed with a rectilinear groove 394 and an orthogonal groove 395 extended to vertically bend from rectilinear groove 394.

A reference numeral 250 denotes a bracket for supporting cassette tape holder 220, this bracket 250 has guide groove 251 for placing cassette tape holder 220 on tape recorder deck 210 of tape driving part 200 at one side thereof.

Hereinafter, the operation of the disc player having the above construction will be described.

Referring to FIG. 1, the disc is placed on the upper surface of disc tray 310 in the state that disc tray 310 is transferred to the outside direction of body 100, which is sensed by a microprocessor, etc. (not shown) to drive the driving motor M of the upper surface of disc deck 320. Thus, first gear group 360 which is connected with driving motor M via a belt pulley, is driven to rotate simultaneously with the driving of the driving motor M. At the same time, the second gear group which is connected with first gear group 360 via a belt pulley is driven to be rotated, and the third gear group 380 which is connected with second gear group 370 via a belt pulley is driven to be rotated.

When third gear group 380 is rotated, disc tray 310 is slided toward the inside of body 100 by disc tray transferring rack 331 formed on the lower surface of disc tray 310 engaged with gear 381 of third gear group 380. Thus, when disc tray 310 is transferred to the predetermined position, disc tray transferring rack 331 formed on the lower surface of disc tray 310 is engaged with gear 371 of second gear group 370 to be subsequently transferred to the position contacted with disc deck 320.

During the sliding transference of disc tray 310 to the inside of body 100 by driving motor M and first, second, and third gear groups 360, 370, and 380, disc tray 310 is smoothly and precisely slided by guide groove 311 formed on the lower surface of disc tray 310 and guide projections 150 formed on the upper surface of disc deck 320 and on both sides of upper surface of right and left guide plates. Particularly, guide projections 150 preferably have lozenge shapes to smoothly transfer disc tray 310.

Thus, disc tray 310 is slidingly transferred to the inside of body 100 to reach the position contacted with disc deck 320. Guide rod 392 projected from disc deck transferring plate 391 formed on one side surface of disc deck 320 is slidingly transferred along guide rail 393 formed on the side of the lower surface of disc try 310. At this time, guide rod 392 is slidingly transferred along rectilinear groove 394 and an orthogonal groove 395 extended to be vertically bent from rectilinear groove 394. When guide rod 392 is slidingly transferred along orthogonal groove 395 of guide rail 393, guide rod 392 is biased to the left as shown in the drawings, and therefore, disc deck transferring plate 391 is slidingly transferred to the left. As above mentioned, when disc deck transferring plate 391 is slidingly transferred to the left, disc deck transferring rack 392 formed at one side end of disc deck transferring plate 391 is engaged with gear 362 of the first gear group 360 to be subsequently rotated.

Meanwhile, as above mentioned, disc deck transferring plate 391 is slidingly transferred, and at the same time, transferring projection 321 of disc deck 320 inserted into sloped groove 397 of disc deck auxiliary transferring plate 396 formed to bend downwards from disc deck transferring plate 391 is upwardly transferred along sloped groove 397, and as a result, disc deck 320 is rotated centering around the one side of body 100. Thus, the transferring of disc tray 310 is completed, and at the same time, disc deck 320 is rotated to clamp disc tray 310 by clamper (not shown), etc.

On the other hand, in the case of the recording and reproducing of the cassette tape, referring to FIG. 4, the cassette tape opening 110 of body 100 and opening 110 of body 100 and cassette tape holder 220 of tape driving part 200 installed at the front part of inside of body 100. Thus, holder 220 in which the cassette tape is inserted is slidingly transferred along guide groove 251 of bracket 250 to be placed on tape recorder deck 210, thereby recording and reproducing the cassette tape becomes possible.

In accordance with the composite recording and reproducing apparatus of the present invention, the recording and/or playback operations can be carried out by inserting the disc or the tape through the single inserting hole. However, according to the above invention, the optical disc and the cassette tape are inserted into only one insertion hole. Thus, inserting both simultaneously can not be performed so that one can not record on or reproduce from the optical disc and the cassette tape simultaneously.

SUMMARY OF THE INVENTION

Therefore, it is an object of the present invention to provide a composite recording and reproducing apparatus which is capable of recording and/or reproducing both an optical disc and a cassette tape simultaneously.

To achieve the above-described object of the present invention, there is provided a composite recording and reproducing apparatus comprising:

a body having a disc inserting hole for inserting a disc and a tape inserting hole for inserting a tape cassette, the disc and tape inserting holes being provided at a front side;

a front panel having a door for opening the disc and tape inserting holes, the front panel being combined with the from side of the body;

a tape driving part for reproducing and driving a tape encased in the tape cassette, the tape driving part being provided at an upper inner portion of the body;

a disc driving part for reproducing the disc, the disc driving part having a disc tray which is slidably transported to an inside and an outside of the body while mounting the disc thereon, racks being formed on both lower sides of the disc tray, the disc driving part transporting the disc tray; and a door opening means for selectively opening the disc door in accordance with the transportation of the disc tray.

The door opening means comprises: a guide member which is slidably formed at an upper surface portion of the tape driving part which neighbors the disc insertion hole, the guide member having a pressing neck which is extendedly formed at one end of the guide member toward the disc door, a guide groove which is formed by cutting so as to have a predetermined width at a center portion of the guide member and a rack which has a predetermined length and is formed at an inner surface of the guide groove; a first gear which is axially supported on an upper surface of the tape driving part, the first gear being rotatable clockwise or counterclockwise within a range of a predetermined angle in accordance with the sliding movement of the tray, the first gear having a rotating portion which is selectively meshed with the rack formed on one side of the tray, and a non-rotating portion which is not meshed with the rack; a second gear which is integrally and coaxially formed under the first gear, the second gear being meshed with the rack provided on the inner surface of the guide groove of the guide member so as to sildably moves the guide member according to the transportation of the tray; and a rotation member formed by extending a lower portion of the disc door which corresponds to the pressing neck of the guide member, the rotation member having first and second contact protrusions and which contact with the pressing neck in order. At this time, a first spring for elastically supporting the disc door toward the inside of the body is preferably provided, both ends of the first spring being fixed to the disc door and one side of the body.

According to one preferred embodiment of the present invention, a stopper is provided for limiting a rotation range of the first gear in clockwise and counterclockwise directions. For example, the stopper comprises: a supporting neck which is protrudingly formed under the first gear; and at least two bosses protrudingly formed on the tape driving part, the supporting bosses being in contact with the supporting neck within a rotation range of the first gear which is rotated by engaging the rotation portion of the first gear with the rack of the tray. A second spring is preferably provided for supporting the supporting neck closely to the bosses due to the rotation of the first gear. Both ends of the second spring are fixed to an upper portion of the first gear and to one side of the body.

While the disc tray is transferred toward the from panel, the guide member is integrally combined with the disc door so that the rotation member which is hinged to the front panel is rotated, thereby opening the disc door. By combining the front panel having the doors for inserting the disc and the tape cassette, the simultaneous insertion of the disc and the tape cassette can be performed. During the transportation of the disc tray for inserting the disc, the disc door can be automatically opened.

BRIEF DESCRIPTION OF THE DRAWINGS

The present invention may be better understood and its numerous objects and advantages will be more apparent to those skilled in the art by reference to the accompanying drawings in which.

DESCRIPTION OF THE PREFERRED EMBODIMENTS

Hereinafter, the present invention will be described in detail with reference to the accompanying drawings.

Figure 6:
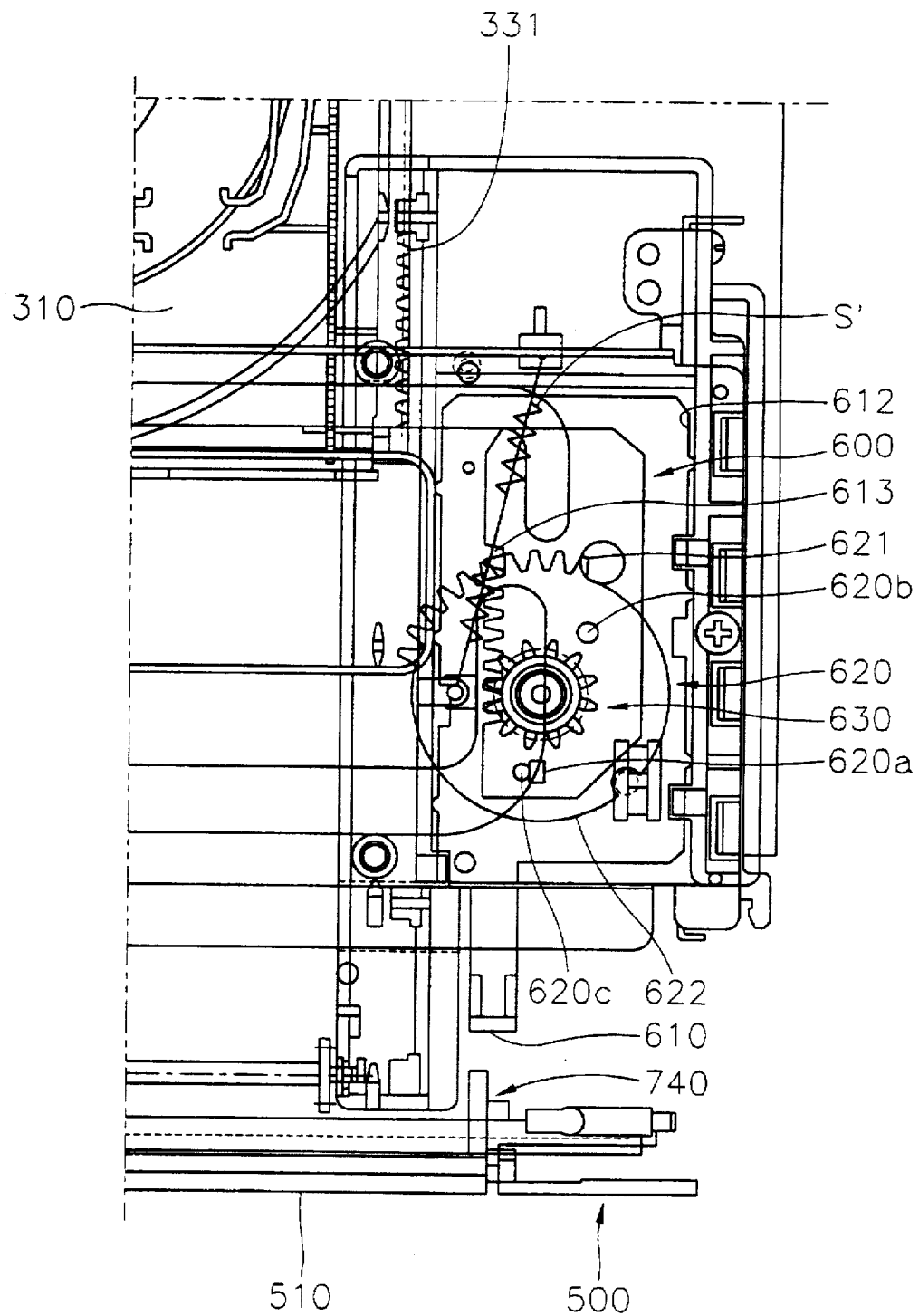
FIG. 6 is a schematic plan view for showing a composite recording and reproducing apparatus according to one embodiment of the present invention.
Figure 7:
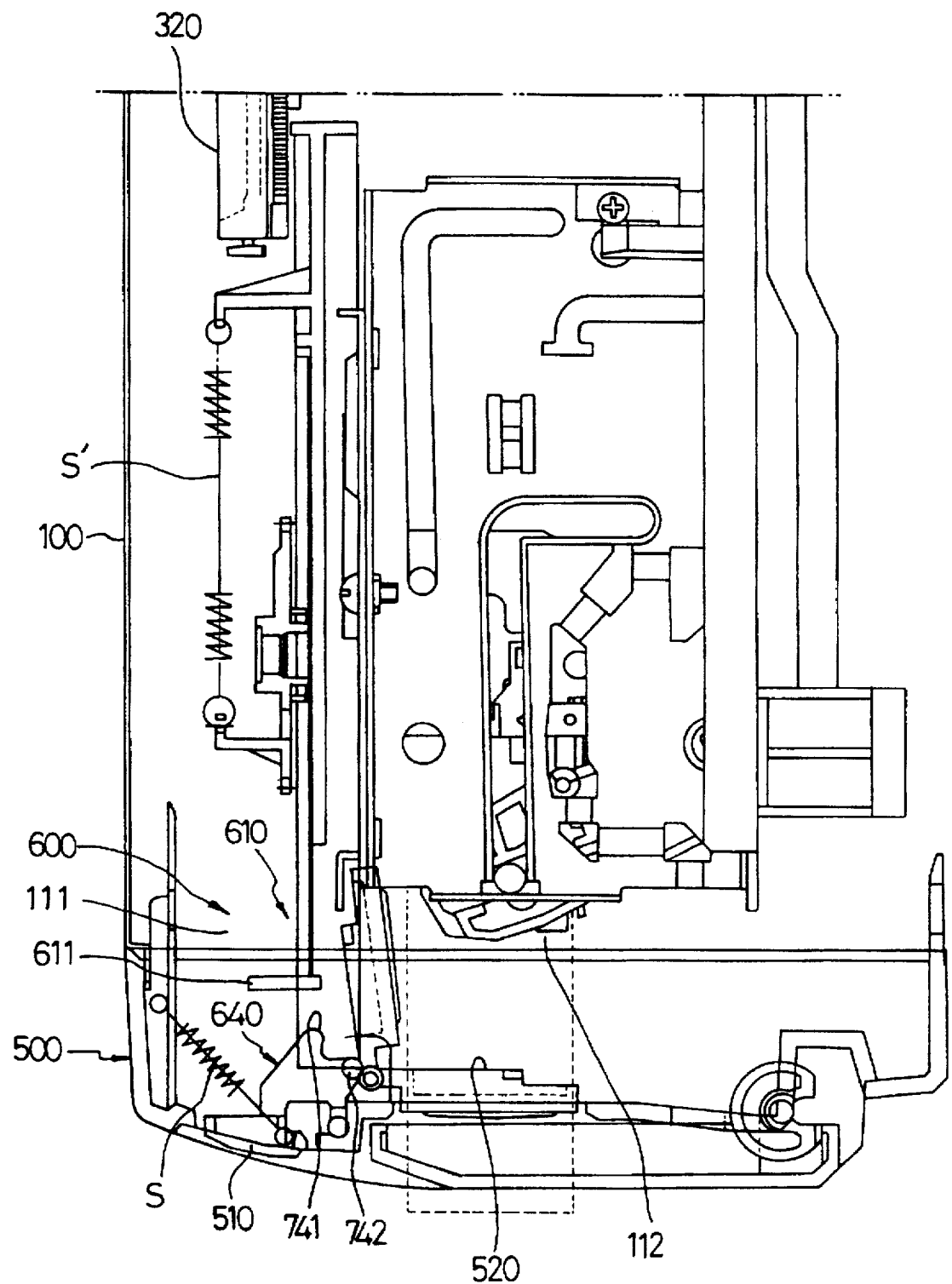
FIG. 7 is a side sectional view of the composite recording and reproducing apparatus as shown in FIG. 6.
Figure 8:
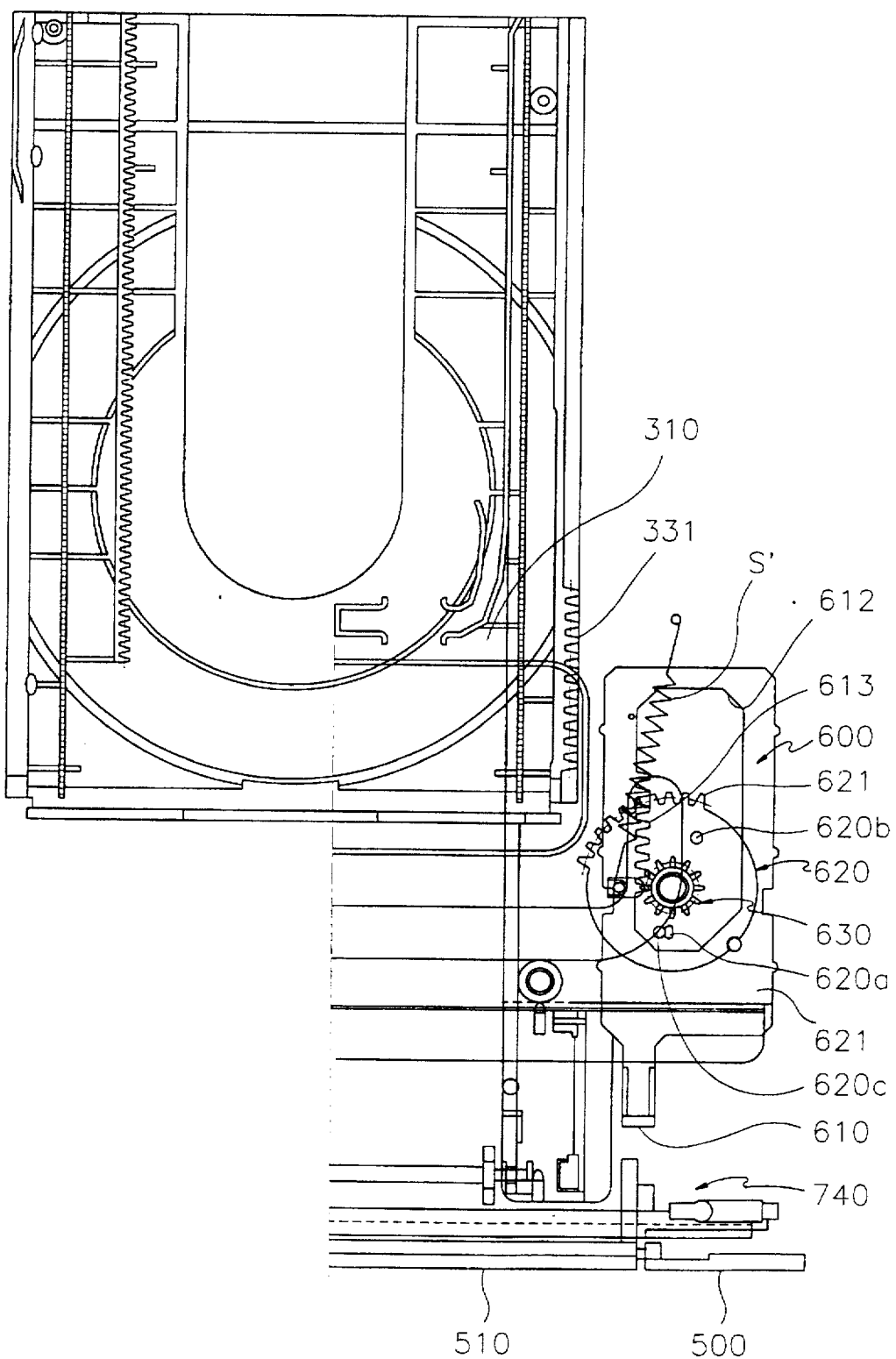
FIGS. 8 and 9 are plan views for showing the operation of the composite recording and reproducing apparatus as shown in FIG. 6.
Figure 9:
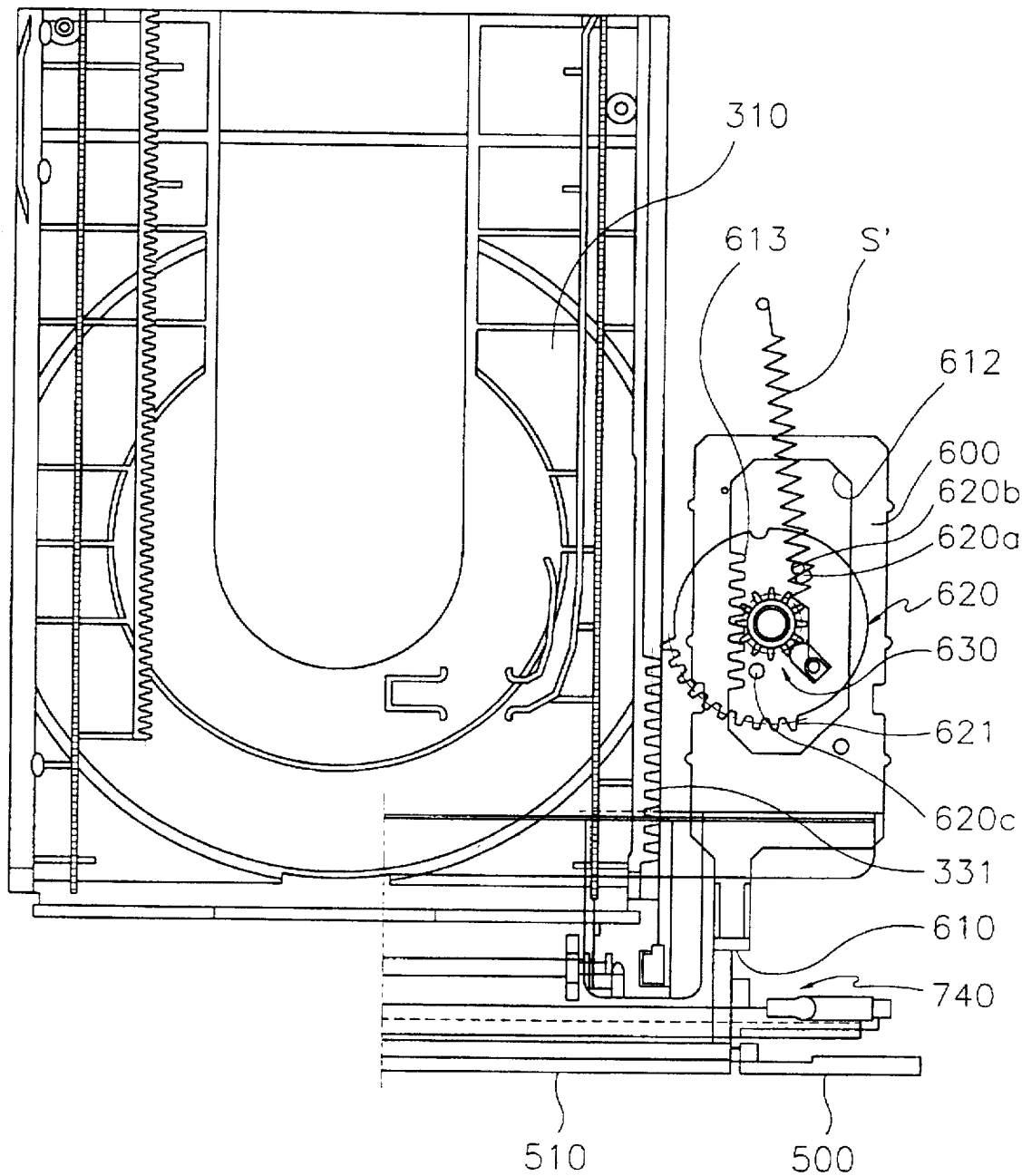

FIG. 6 is a schematic plan view for showing a composite recording and reproducing apparatus according to one embodiment of the present invention, and FIG. 7 is a side sectional view of the composite recording/reproducing apparatus as shown in FIG. 6. FIGS. 8 and 9 are plan views for showing the operation of the composite recording/ reproducing apparatus as shown in FIG. 6, and FIGS. 10 to 13 are side sectional views for showing the operation of the composite recording/reproducing apparatus as shown in FIG. 6.

With regard to the composite recording/reproducing apparatus as shown in FIGS. 6 to 13, the explanation will be given with reference to FIGS. 1 to 5, wherein the same members are referred to with the same reference numerals.

As shown in FIG. 7, a composite recording/reproducing apparatus of the present invention includes a body 100 having a disc insertion hole 111 for inserting a disc and a cassette insertion hole 112 for inserting a tape cassette at a front side of body 100. As shown in the figure, disc insertion hole 111 is located at an upper portion of body 100 and a cassette insertion hole 112 is located below disc insertion hole 111.

At the front of body 100, a front panel 500 is provided. Front panel 500 has a disc door 510 and a cassette door 520 for alternatively opening disc insertion hole 111 and cassette insertion hole 112. Disc door 510 is formed at a position which corresponds to disc insertion hole 111 and cassette door 520 is formed at a position which corresponds to cassette insertion hole 112.

A tape driving part 200 is provided at the inside of body 100 which neighbors disc and cassette insertion holes 111 and 112, to reproduce and drive the cassette tape encased in the tape cassette. Tape driving part 200 is provided with a tape recorder deck 210 and a holder 220, and tape recorder deck 210 is provided with a running system having a head dram (not shown). Holder 220 is provided for placing the tape on the tape recorder deck 210.

Meanwhile, a disc driving part 300 to drive an optical disc is provided behind tape driving pan 200. Disc driving part 300 is provided with a disc tray 310 for mounting the disc thereon. Disc tray 310 having the disc mounted thereon is slidably transferred to the inside or the outside of the body 100 by a tray transferring apparatus 330. A pair of guide grooves 311 and 311 is formed on both sides of the lower surface of disc tray 310. Disc driving part 300 is also provided with a disc deck rotating apparatus 390 to transfer disc deck 320 to a loading position. The disc transferred by disc tray 310 is placed on disc deck 320 which is rotated by disc deck rotating apparatus 390 which is in the hinged state with one side of body 100.

Meanwhile, right and left guide plates 140, 140' are fixedly located on both sides of the upper surface of body 100 between tape driving part 200 and disc driving part 300. A plurality of guide projections 150 are projectedly formed at the predetermined positions of the right and left guide plates 140 and 140' and the upper surface of disc deck 320, i.e., at the positions corresponding to guide grooves 311 of disc tray 310.

Guide projections 150 formed at the positions corresponding to guide grooves 311 of disc tray 310 preferably have lozenge shapes in order to smoothly transfer disc tray 310. In this manner, the friction between guide grooves 311 of disc tray 310 and guide projections 150 formed at the positions corresponding to them is minimized so that disc tray 310 can be smoothly slided along guide projections 150.

Above tape driving part 200, a door opening apparatus 600 is formed to selectively open disc door 510 in accordance with the movement of disc tray 310 of disc driving part 300.

As shown in FIG. 7, door opening apparatus 600 has a guide member 610 which is slidably located on the upper surface portion of tape driving part 200 which neighbors disc insertion hole 111. Door opening apparatus 600 further includes a first gear 620 and a second gear 630. At one end of guide member 610, a pressing neck 611 is extendedly formed therefrom toward disc door 510. At the center portion of guide member 610, a guide groove 612 which is formed by cutting so as to have a predetermined width. A rack which has a predetermined length is formed at the inner surface of guide groove 612.

First gear 620 is axially supported on the upper surface of tape driving part 200. First gear 620 rotates clockwise or counterclockwise within the range of a predetermined angle in accordance with the sliding movement of tray 310. First gear has a rotating portion 621 which is selectively meshed with rack 331 formed on one side of tray 310, and a non-rotating portion 622 which are not meshed with rack 331. First gear 620 rotates only when rotating portion 621 of first gear 620 is meshed with rack 331 of tray 310.

Under first gear 620, second gear 630 is integrally and coaxially formed with first gear 620. Second gear 630 is meshed with rack 613 provided on the inner surface of guide groove 612 of guide member 610. Second gear 630 sildably moves guide member 610 according to the movement of tray 310.

In order to rotate first gear 620 in the clockwise or counterclockwise direction according to the movement (transfer) of tray 310, rotating portion 621 of first gear 620 should be precisely meshed with rack 331 of tray 310. Therefore, a stopper apparatus is necessary for the precise engagement of rotating portion 621 with rack 331 of tray 310. The stopper apparatus for limiting the rotating range of first gear 620, is formed between first gear 620 and tape driving part 200.

The stopper apparatus which limits the rotating range of first gear 620, has a supporting neck 620a formed at the lower surface of first gear 620. A first and second supporting bosses 620b and 620c which are selectively in contact with supporting neck 620a within the rotating range of first gear 620 under the state that rotating portion 621 of first gear 620 is engaged with rack 331 of tray 310, are formed on the upper surface portions of tape driving part 200. Further, a spring S' is provided for the closer contact between supporting neck 620 and first and second supporting bosses 620b and 620c while first gear 620 rotates. One end of spring S' is connected with an upper portion of first gear 620 and the other end of spring S' is connected with one side of body 100.

As shown in FIGS. 6 and 7, a rotating member 740 is rotatably hinged to front panel 500 at the lower portion of disc door 510 which corresponds to pressing neck 611 of guide member 610. Rotating member 740 is formed by extending the lower portion of disc door 510 and has first and second contact protrusion 741 and 742 which contact with pressing neck 611 in order. When guide member 610 moves toward the front panel, first contact protrusion 741 which has a relatively large rotating radius centering the fixing point of rotating member 740 to front panel 500, firstly contacts with pressing neck 611 and, then second contact protrusion 742 which has a rotating radius smaller than that of first contact protrusion 741. A recessed portion is formed between first and second contact protrusions 741 and 742 so as to provide a smooth contact with pressing neck 611.

According to the movement of pressing neck 611 of guide member 610 toward front panel 500, rotating member 740 rotates and thus disc door 510 is opened. Disc door 510 is elastically supported toward the inside of body 100 by spring S both ends of which are fixed to the inner side surface of door 510 and the inner side surface of body 100.

Cassette door 520 into which the tape cassette is inserted, is rotatably hinged to front panel 500 toward the inside of body 100, as in a conventional tape recorder.

Hereinafter, referring to FIGS. 8 to 13, the operation of the composite recording/reproducing apparatus having the above structure will be explained.

As shown in FIGS. 8 and 9, when tray 310 is transferred toward front panel 500 from disc driving part 300 by the tray transferring apparatus, rack 331 formed on one side of tray 310 comes to be engaged with rotating portion 630 of first gear 620 to rotate first gear 620. At this time, second gear 630 which is integrally formed under first gear 620 rotates simultaneously. Here, since second gear 630 is in the engagement state with rack 613 formed on guide groove 612 of guide member 610, guide member slidably moves toward front panel 500. At the same time, disc door 510 is opened by pressing neck 611 which is formed by extending one end of guide member 610.

Referring to FIGS. 10 to 13, the composite recording/reproducing apparatus according to the present embodiment will be explained in more detail.

Figure 10:
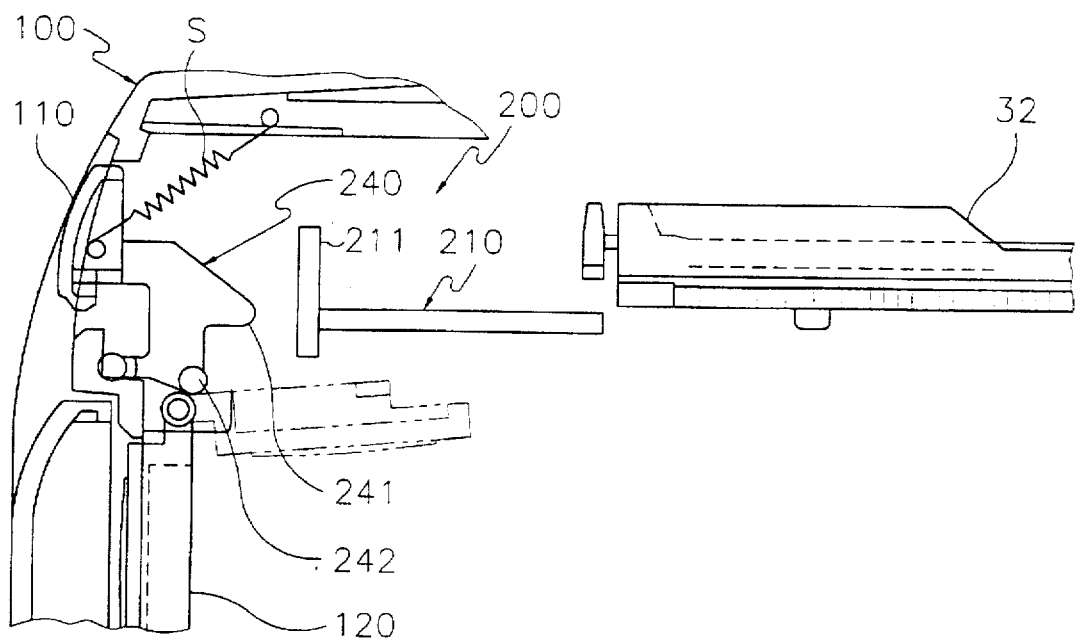
FIGS. 10 to 13 are side sectional views for showing the operation of the composite recording/reproducing apparatus as shown in FIG. 6.
Figure 11:
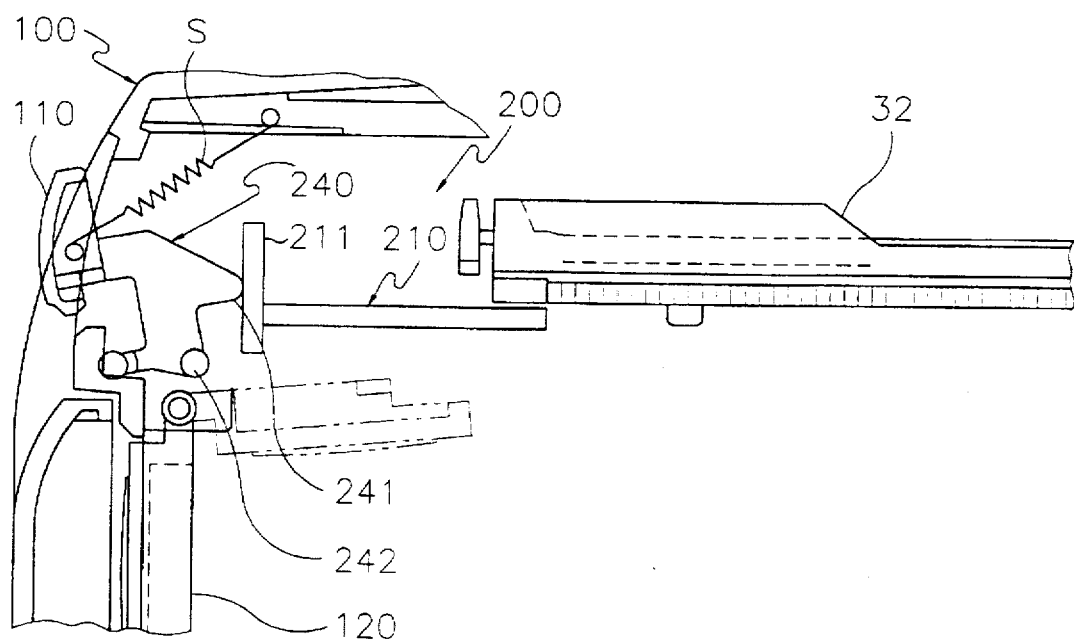
Figure 12:
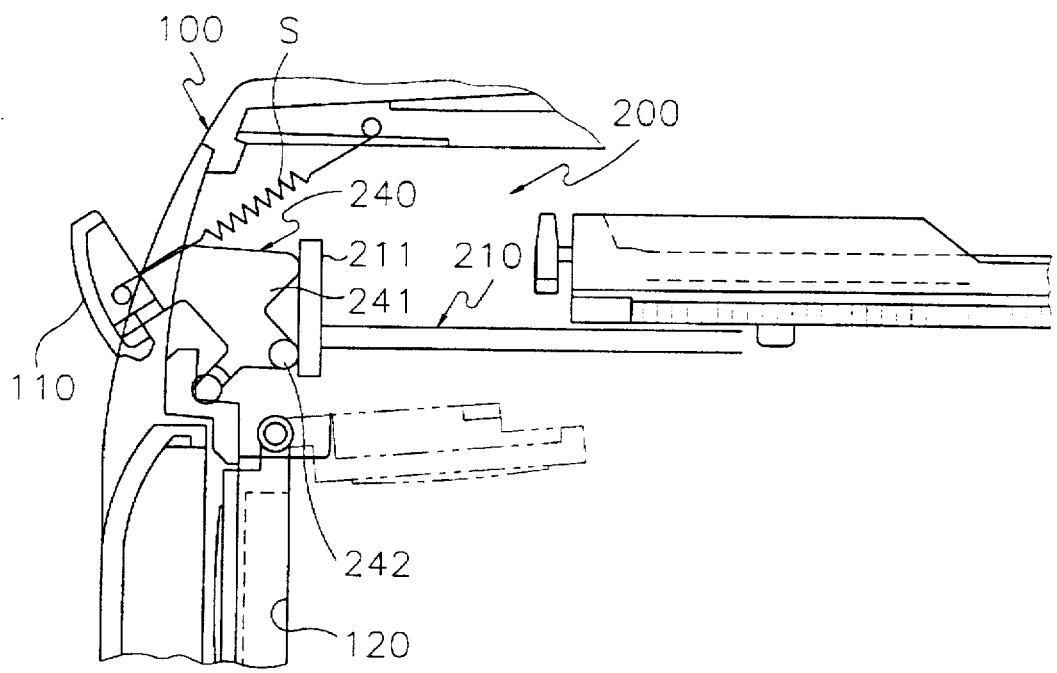

FIG. 10 shows the same situation as in FIG. 8, that is, the procedure wherein tray 310 is transferred by the tray transferring apparatus. FIG. 11 shows the procedure wherein tray 310 is engaged with rotating portion 621 of first gear 620 shown in FIG. 8 after tray 310 is transferred by a predetermined length. At this time, as shown in FIG. 9, first gear 620 is rotated counterclockwise in the predetermined angle. According to the rotation of first gear 620 as above, second gear 630 is rotated so that guide member is transferred by a predetermined length by second gear 630. Therefore, pressing neck 611 which is formed at the end portion of guide member 610 presses first contact protrusion 741 which has a relatively large rotating radius to slightly open disc door 510.

At this state, when tray 310 moves more slightly, guide member 610 shown in FIG. 9 is moved more slightly as shown in FIG. 9 by first and second gear 620 and 630 of FIG. 9. At the same time, pressing neck 611 comes in contact with both first contact protrusion 741 and second contact protrusion which has a rotation radius smaller than that of first contact protrusion 741 and thus disc door 510 is opened further.

Figure 13:
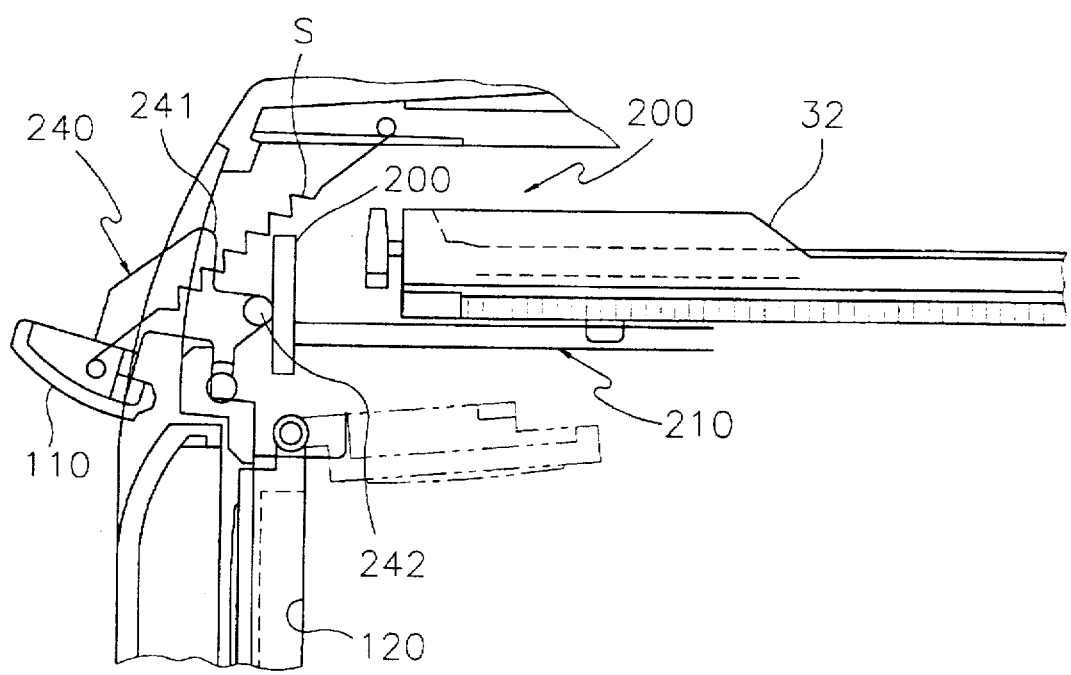

At this state shown in FIG. 9, when tray 310 moves more, the engagement of rotation portion 621 of first gear 620 with rack 331 of tray 310 is completed so that due to the presence of non-rotation portion 622 of first gear 620, first gear 620 is not engaged with rack 331 of tray 310. Then, as shown in FIG. 13, the state that pressing neck 611 presses second contact protrusion 742 which has a rotation radius smaller than that of first contact protrusion 741 and thus disc door 510 is completely opened by rotation member 740.

Figure 1:
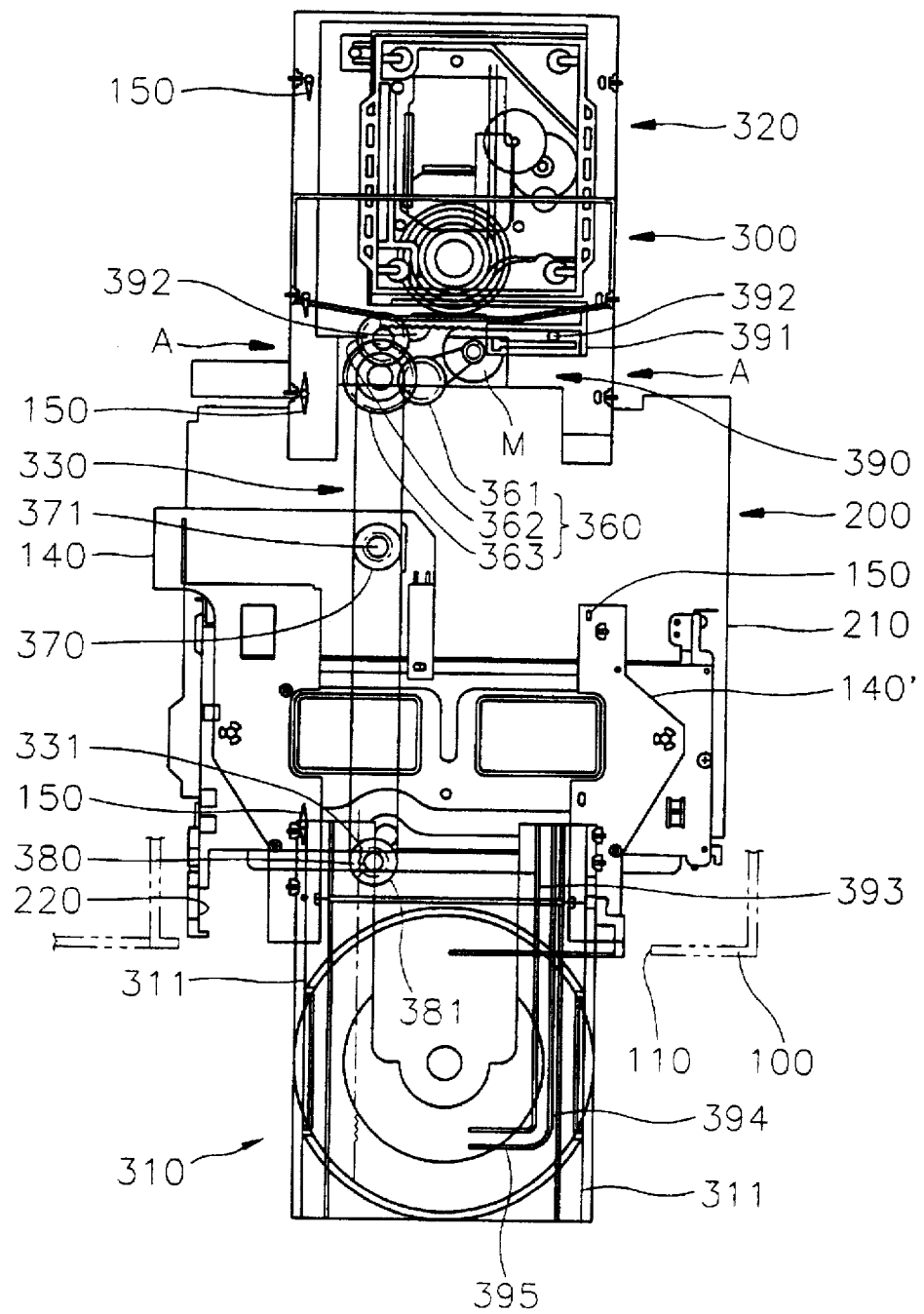
FIG. 1 is a schematic plan view for showing a composite recording and reproducing apparatus.
Figure 2:
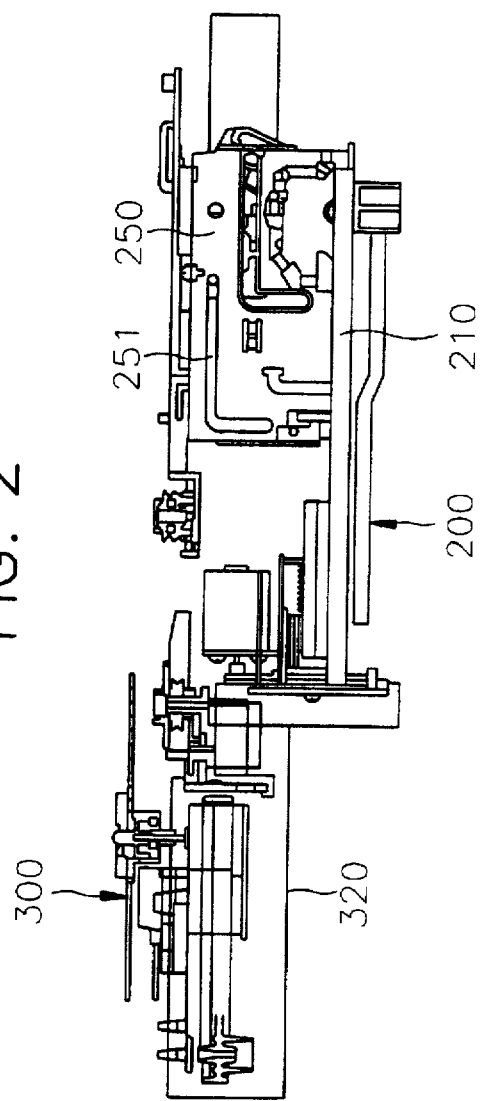
FIG. 2 is a left side elevational view for showing the composite recording and reproducing apparatus of FIG. 1.
Figure 3:
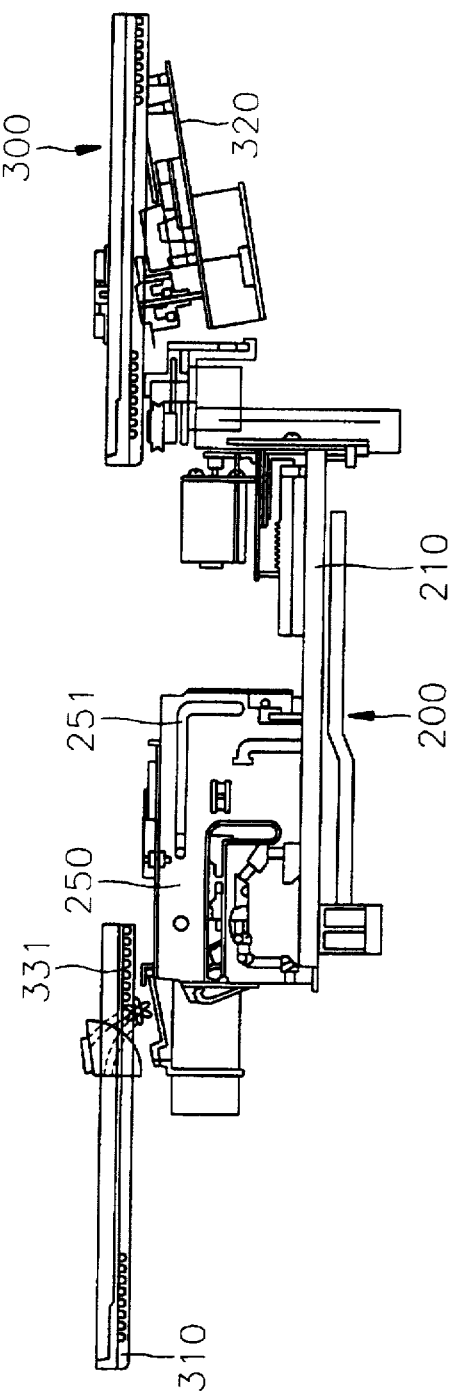
FIG. 3 is a right side elevational view for showing the composite recording and reproducing apparatus of FIG. 1.
Figure 4:
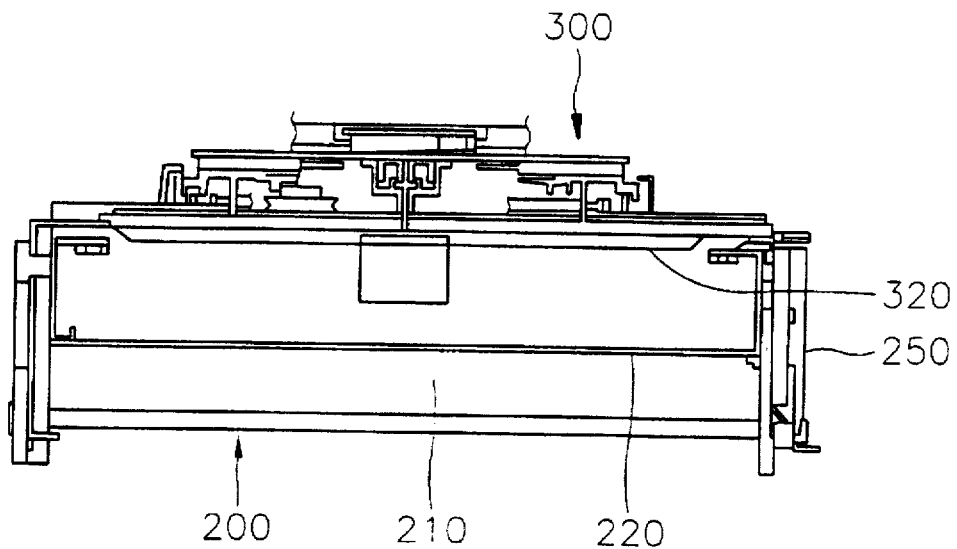
FIG. 4 is a front elevational view for showing the composite recording and reproducing apparatus of FIG. 1.
Figure 5:
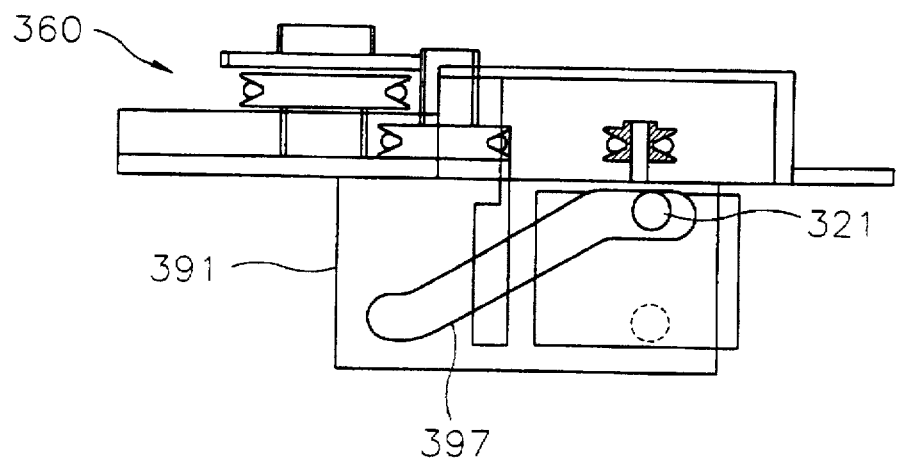
FIG. 5 is an enlarged partial view of a cross-section taken along the line A—A of the composite recording and reproducing apparatus of FIG. 1.

At this time, supporting neck 620a formed under first gear 620 as shown in FIG. 9 is pressively contact with second supporting boss which is protrudingly formed on one side of tape driving part 200 as shown in FIG. 4. The fluctuation of first gear 620 due to an external shock is prevented by the tension force of spring S'.

At this state, when tray 310 is transferred more by the tray transferring apparatus so that tray 310 is more protruded outside disc door 510 to complete the transportation of tray 310, a disc can be mounted on the upper surface of tray 310 or a disc which is mounted on tray 310 can be removed from disc tray 310.

After mounting a disc on tray 310 or removing the disc from tray 310, the reverse operation to the above tray transferring operation may be performed so as to move tray 310 toward disc driving part 300. At this time, during the transferring operation of tray 310 toward disc driving part 300, rack 331 of tray 310 rotates first gear 620 in the clockwise direction. Consequently, first gear 620 returns to its initial position as shown in FIG. 8. At this state, it is maintained that supporting neck 620a which is formed on the lower surface of first gear 620 is pressively contact with first supporting boss 620b which is protrudingly formed on tape driving part 200. In this manner, the engagement of rack 331 with first gear 620 can be precisely maintained regardless of the reciprocal movement of tray 310.

In the meantime, when opening tape door 520, tape door 520 which is rotatably hinged to front panel 500, is rotated toward the inner upper portion of body 100 shown in FIG. 7 by the insertion of the cassette tape, as shown in FIGS. 10 to 13. Therefore, the insertion of the cassette tape can be performed smoothly.

As described above, according to the composite recording and reproducing apparatus of the present invention, a front panel having doors for inserting the disc and the cassette tape, is combined with the body so that both the disc and cassette tape may be inserted at the same time. Therefore, the simultaneous recording and reproducing operations of both the disc and the cassette tape, can be performed. Further, during the transportation operation of the tray for inserting the disc, the disc door is automatically opened. Therefore, the composite recording/reproducing apparatus can be conveniently used.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A recording and reproducing apparatus comprising:

a body having a disc inserting hole for inserting a disc and a tape inserting hole for inserting a tape cassette, the disc and tape inserting holes being provided at a front side;

a front panel having a door for opening the disc and tape inserting holes, said front panel being combined with the front side of said body;

a tape driving part for reproducing and driving a tape encased in the tape cassette, said tape driving part being provided at an upper inner portion of said body;

a disc driving part for reproducing the disc, said disc driving part having a disc tray which is slidably transported to an inside and an outside of said body while mounting the disc thereon, a first rack being formed on both lower sides of said disc tray respectively, said disc driving part transporting said disc tray;

a door opening means for selectively opening the disc door in accordance with the transportation of the disc tray, the door opening means comprising: a guide member which is slidably formed at an upper surface portion of said tape driving part which neighbors the disc insertion hole, said guide member having a pressing neck which is extendedly formed at one end of said guide member toward the door; a guide groove which is formed by cutting so as to have a predetermined width at a center portion of said guide member and a second rack which has a predetermined length and is formed at an inner surface of the guide groove; a first gear which is axially supported on an upper surface of said tape driving part, said first gear being rotatable clockwise or counterclockwise within a range of a predetermined angle in accordance with the sliding movement of the tray, said first gear having a rotating portion which is selectively meshed with the first rack formed on one side of the tray, and a non-rotating portion which is not meshed with the first rack; a second gear which is integrally and coaxially formed under said first gear, said second gear being meshed with the second rack provided on the inner surface of the guide groove of said guide member so as to slidably move said guide member according to the transportation of the tray; and a rotation member formed by extending a lower portion of said door which interacts with the pressing neck of said guide member, said rotation member having first and second contact protrusions which make contact with the pressing neck in order; and a stopper for limiting a rotation range of said first gear in clockwise and counterclockwise directions, said stopper comprising a supporting neck which is protrudingly formed under said first gear and at least two bosses protrudingly formed on said tape driving part, said supporting bosses being in contact with said supporting neck within a rotation range of said first gear which is rotated by engaging the rotation portion of said first gear with the first rack of the tray.

2. A recording and reproducing apparatus according to claim 1, said apparatus further comprising a spring for elastically supporting the disc door toward the inside of said body, both ends of said spring being fixed to said disc door and one side of said body, respectively.

3. A recording and reproducing apparatus according to claim 1, said apparatus further comprising a spring for supporting said supporting neck closely to said bosses due to the rotation of said first gear, both ends of said spring being fixed to an upper portion of said first gear and to one side of said body, respectively.

4. A composite recording and reproducing apparatus comprising:

a body having a disc inserting hole for inserting a disc and a tape inserting hole for inserting a tape cassette, the disc and tape inserting holes being provided at a front side;

a front panel having a door for opening the disc and tape inserting holes, said front panel being combined with the front side of said body;

a tape driving part for reproducing and driving a tape encased in the tape cassette, said tape driving part being provided at an upper inner portion of said body;

a first spring for elastically supporting the disc door toward the inside of said body, both ends of said first spring being fixed to said disc door and one side of said body;

a disc driving part for reproducing the disc, said disc driving part having a disc tray which is slidably transported to an inside and an outside of said body while mounting the disc thereon, a first rack being formed on both lower sides of said disc tray respectively, said disc driving part transporting said disc tray; and a door opening means for selectively opening the disc door in accordance with the transportation of the disc tray, said door opening means comprising: a guide member which is slidably formed at an upper surface portion of said tape driving part which neighbors the disc insertion hole, said guide member having a pressing neck which is extendedly formed at one end of said guide member toward the disc door, a guide groove which is formed by cutting so as to have a predetermined width at a center portion of said guide member and a second rack which has a predetermined length and is formed at an inner surface of the guide groove; a first gear which is axially supported on an upper surface of said tape driving part, said first gear being rotatable clockwise or counterclockwise within a range of a predetermined angle in accordance with the sliding movement of the tray, said first gear having a rotating portion which is selectively meshed with the first rack formed on one side of the tray, and a non-rotating portion which is not meshed with the first rack; a second gear which is integrally and coaxially formed under said first gear, said second gear being meshed with the second rack provided on the inner surface of the guide groove of said guide member so as to slidably move said guide member according to the transportation of the tray; a rotation member formed by extending a lower portion of said disc door which interacts with the pressing neck of said guide member, said rotation member having first and second contact protrusions which make contact with the pressing neck in order; and a stopper for limiting a rotation range of said first gear in clockwise and counterclockwise directions, said stopper having a supporting neck which is protrudingly formed under said first gear, at least two bosses protrudingly formed on said tape driving part, said bosses being in contact with said supporting neck within a rotation range of said first gear which is rotated by engaging the rotation portion of said first gear with the first rack of the tray, and a second spring for supporting said supporting neck closely to said bosses due to the rotation of said ·first gear, both ends of said second spring being fixed to an upper portion of said first gear and to one side of said body, respectively.

* * * * *